T. BRÜNER.
WHEEL-PLOWS.

No. 194,029.  Patented Aug. 14, 1877.

Witnesses:
Theo. Mungen
H. A. Daniels

Inventor:
Theodore Brüner
by I. S. Kittogg
Attorney.

UNITED STATES PATENT OFFICE.

THEODOR BRÜNER, OF RICHFIELD, MINNESOTA.

IMPROVEMENT IN WHEEL-PLOWS.

Specification forming part of Letters Patent No. 194,029, dated August 14, 1877; application filed September 16, 1876.

*To all whom it may concern:*

Be it known that I, THEODOR BRÜNER, of Richfield, in the county of Hennepin and State of Minnesota, have invented certain new and useful Improvements in Wheel-Plows; and I do hereby declare that the following is a full, clear, and exact description thereof, which will enable others skilled in the art to which it appertains to make and use the same, reference being had to the accompanying drawings, and to the letters of reference marked thereon, which form a part of this specification, like letters designating like parts in the several figures in said drawing.

My invention relates to that class of agricultural implements known as wheel-plows; and consists in certain improvements in the construction of the same, as hereinafter shown and described.

Figure 1:
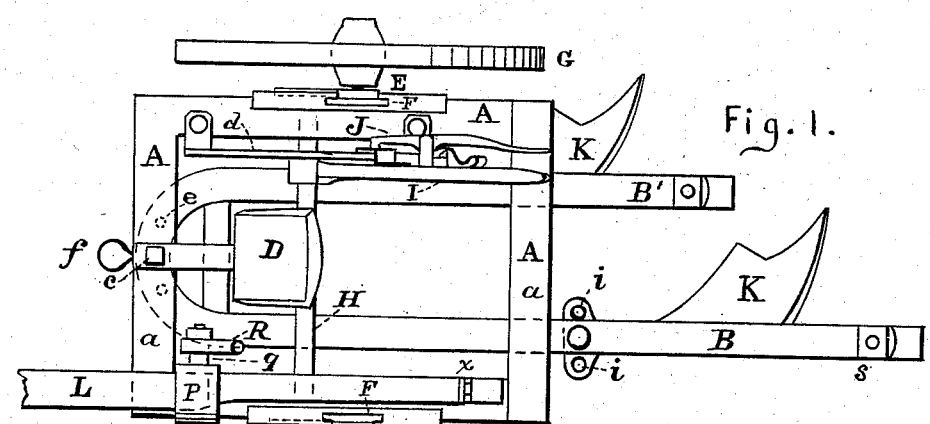
Figure 2:
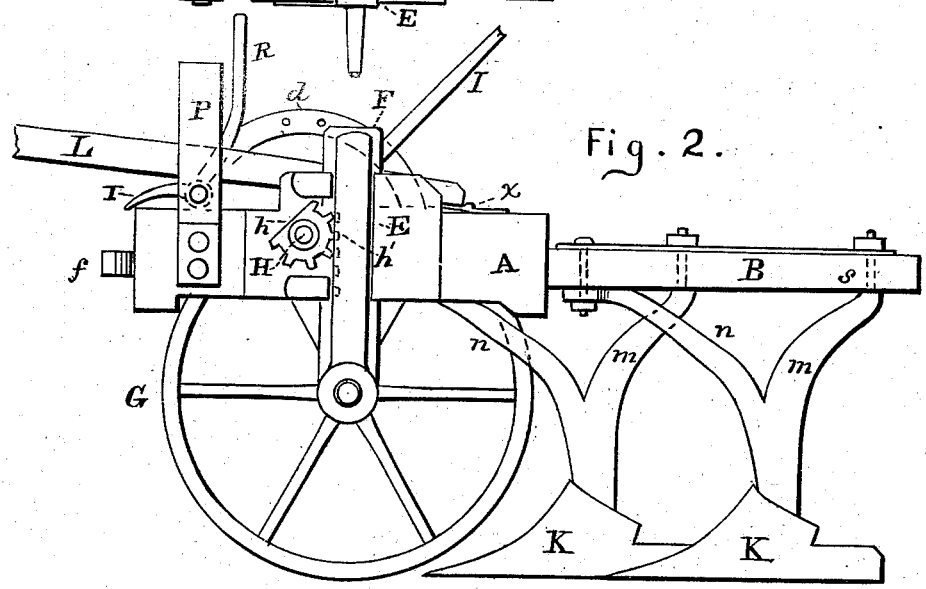
Figure 3:
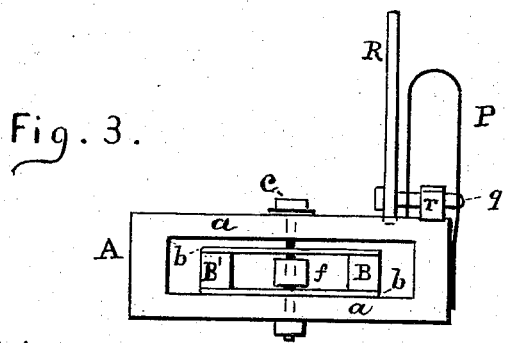

In the accompanying drawing forming part of the specification herein, Figure 1 is a plan view of my improved wheel-plow. Fig. 2 is a side view of the same. Fig. 3 is a front view of the plow-carriage frame.

In the said drawing, A designates the frame of the plow-carriage, having openings formed by the cross-pieces $a$, at the front and rear thereof, as shown. Within the frame, and passing through the opening in the rear, are the two plow-beams B and B′, the former being somewhat longer than the latter, and both being connected at their forward extremities, and provided with the plates $b$, rigidly fastened thereto, and having apertures $e$ for the purpose of a laterally-adjustable connection with the front part of the frame by means of the bolt $c$, secured by a nut. By the said bolt $c$ the driver's seat D is secured to the frame A, as shown, and a draft-hook, $f$, is also secured to the front for use when desired.

For the purpose of raising or lowering the frame and plow-beams in the alternate working of the plows and the running part, the following apparatus is provided. Two vertical ways, E, are firmly secured to the frame A, one on each side thereof, and formed to receive the flanged slides F therein, so that the latter may be moved up and down. The said slides F extend down a suitable distance, and have fixed to them, at or near their lower extremities, the axles of the vehicle-wheels G. The rock-shaft H extends across the frame A, having bearings therein, and is provided with a hand-lever, I, rigidly fastened to said shaft. To each extremity of said shaft H, just outside of the frame A, is firmly fixed a toothed segment, $h$, which engages with a rack, $h'$, formed in each of the slides F, as shown, so that by a forward movement of lever I, turning the shaft H, connecting with the slides F by means of the toothed segments $h$, the wheels G are raised, and the frame A and the plow-beams are allowed to sink. By a backward movement of said lever I the movement of the slides F is reversed, the plow-beams are raised, and the frame rests upon the wheels G, so that the machine may be driven off.

By this construction and combination both of the wheels G, or both plow-beams, are raised or lowered simultaneously and equally by a single movement of the lever I on the rock-shaft H, such raising or lowering being effected through the toothed segments $h$ and racks $h'$, and the degree of elevation or depression being fixed by means of spring-pawl J on lever I and the rack $d$.

The racks $h'$ are provided with notches, which are less in number than the teeth of the segments $h$, the effect of which is to stop the downward movement of the slides F, so that said slides shall not move too far down the ways E. The lever I is fixed or set at the desired point by means of the spring-pawl J and curved rack $d$, the latter being fixed to the frame A.

Each of the plows K is constructed with its parts—mold-board, land-side, and share—in one formation or solid together. Its standard $m$, inclining backward, is secured to the plow-beam at $s$, and is provided with a branch, $n$, extending upward and forward, as shown, to form a brace against the plow-beam to which it is adjustably-connected, the upper extremity of the brace $n$ being widened, and provided with holes $i$ for the connecting-bolt, so that, by a lateral adjustment of the brace $n$ to the plow-beam, the width of the furrow may be regulated.

The draft-pole L is hinged or coupled to the frame A at $x$, and passes forward through a guard, P, secured upon the frame, and within said guard and under the pole L is located a short shaft, $q$, provided with a hand-lever, R, a tongue, $r$, projecting from shaft $q$, by means of which the draft-pole may be raised by a movement of the lever R.

Having described my invention, I claim—

In combination with the frame A, having openings at its front and rear, the plow-beams connected, as shown, and provided with the perforated plates b and bolt c, as and for the purpose set forth.

In testimony that I claim the foregoing as my own I affix my signature in presence of two witnesses.

THEODOR BRÜNER.

Witnesses:
  THOS. RICHARDSON,
  JOHN J. SALDEN.